April 21, 1936.  H. SCHICHT  2,037,930

MACHINE FOR CUTTING BEVEL GEARS WITH LONGITUDINALLY CURVED TEETH

Filed Dec. 17, 1930

Inventor
Heinrich Schicht
By Dodge and Sons
Attorneys

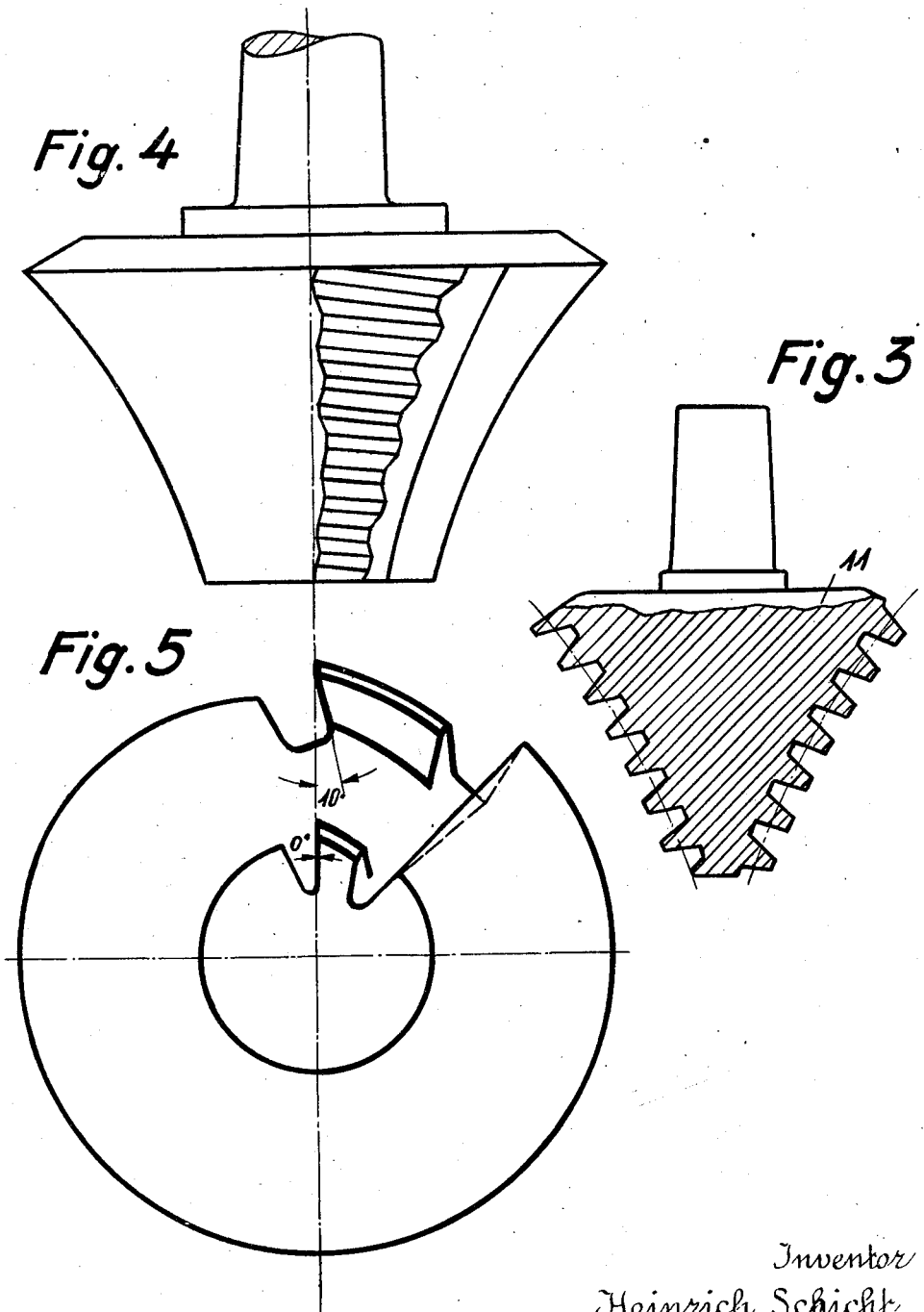

April 21, 1936.    H. SCHICHT    2,037,930
MACHINE FOR CUTTING BEVEL GEARS WITH LONGITUDINALLY CURVED TEETH
Filed Dec. 17, 1930    7 Sheets-Sheet 3

Inventor
Heinrich Schicht
By Dodge and Sons
Attorneys

April 21, 1936. H. SCHICHT 2,037,930
MACHINE FOR CUTTING BEVEL GEARS WITH LONGITUDINALLY CURVED TEETH
Filed Dec. 17, 1930 7 Sheets-Sheet 6

April 21, 1936.  H. SCHICHT  2,037,930
MACHINE FOR CUTTING BEVEL GEARS WITH LONGITUDINALLY CURVED TEETH
Filed Dec. 17, 1930    7 Sheets-Sheet 7

Inventor
Heinrich Schicht
By
Attorneys

Patented Apr. 21, 1936

2,037,930

UNITED STATES PATENT OFFICE 2,037,930

MACHINE FOR CUTTING BEVEL GEARS WITH LONGITUDINALLY CURVED TEETH

Heinrich Schicht, Huckeswagen, Germany, assignor to firm W. Ferd. Klingelnberg Söhne, Remscheid-Berghausen, Germany Application December 17, 1930, Serial No. 503,081
In Germany December 21, 1929

2 Claims. (Cl. 90—4)

Although spiral-toothed bevel gears are in many respects superior to straight-toothed bevel gears, their advantages have not sufficed to overcome the disinclination of many users to adopt bevel gearing for general purposes.

The principal cause of this disinclination is no doubt the fact that it is difficult or expensive in practice to adjust two shafts to the accurate angle for meshing bevel gears and hold them permanently in the correct position for maintaining noiseless running. This is especially the case in automobile practice, when mounting rear wheel differentials. Even with accurately cut teeth the usual bevel gears are more or less highly sensitive to axial displacements, vibrations, unavoidable errors of assembly and so on.

This invention is concerned, firstly, with the production of hobbed bevel gears with teeth of approximately uniform height throughout the length, having a particular form of curvature, which imparts a very high degree of insensitiveness to displacements, assembly errors and so on, the distinctive feature of the gears being that the tooth spaces, though of equal width at the major and minor diameters of the wheel, are not of uniform width throughout their length, the teeth having a sharper curvature on the convex side than on the concave side, so that the convex side is crowned or bulged, and meshing contact occurs in general only along some portion between the ends. Secondly the invention is concerned with the process, hob cutter and machine for shaping such bevel gears. The gears may be cut for meshing with intersecting or off-set axes.

There are several machine constructions known adapted for toothing bevel gears with tooth spaces uniform in width from end to end. The machine according to our invention is designed for cutting, with an appropriate hob, teeth having the "crown" or bulge hereinbefore referred to, and the curve thus produced will be designated a "Palloid" curve hereinafter.

My invention will now be described with reference to the annexed drawings.

Fig. 3 is a section in the axial plane of the hob cutter.

Fig. 4 is a hob the teeth of which are undercut at the cutting faces.

Fig. 5 is an end view of the hob, as shown by Fig. 4.

What we have called the insensitiveness of our improved bevel gears is due to the fact that the teeth are curved more sharply on the convex side than on the concave side so that the teeth are slightly convex and tooth contact only occurs over a greater or less length of surface in the central part. The curves according to which the crowned tooth flanks are shaped are called Palloid curves.

Figure 1:
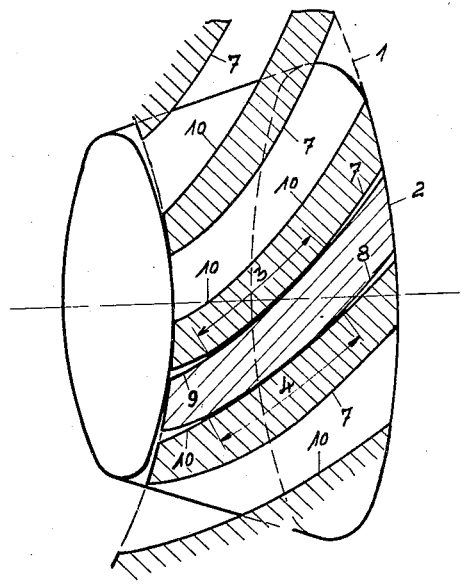
Fig. 1 is a section taken in one plane of a face gear 1 and a pinion tooth 2 developed in this plane, the pinion tooth being shown in the correct position with respect to the face gear.
Figure 2:
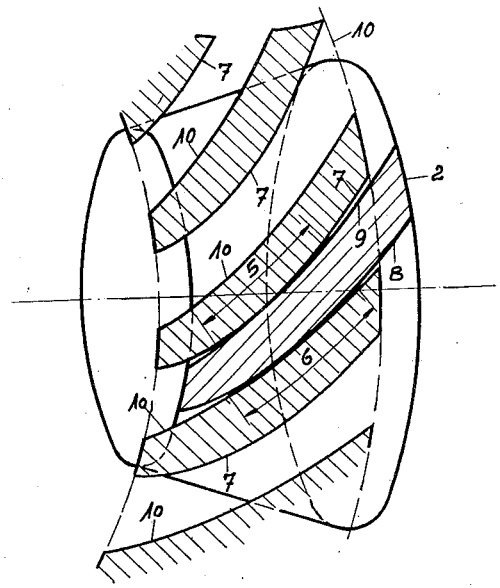
Fig. 2 is a similar section, showing the pinion tooth displaced from the correct position.

These bevel gears shaped according to this invention are cut by a continuous rolling milling or hobbing process, performed with one hob cutter simultaneously shaping convex and concave tooth curves of varying curvature in one operation (see Figs. 1 and 2). By virtue of the special character of the process it is possible to form the tooth curves in such a way that if relative displacement of the coacting gears occurs, the area of flank contact shifts about the center of the contact line, and while a large contact zone is maintained, it is free to shift in either direction without causing the teeth to become wedged and the gears to work noisily.

As shown in Fig. 1 the flanks 7 and 9 make contact with each other within the zone 3, if the pinion drives in one direction, and the flanks 8 and 10 make contact with each other within the zone 4 if the pinion drives in the opposite direction. By shifting the pinion as shown in Fig. 2 the tooth contact is displaced to the zone 5 or 6, without resulting in a noisy point contact at the outer or inner edge of the tooth. Hence, the teeth are within limits insensitive to relative displacement of the gears.

With the type of tooth curve described it is possible to have the zone of flank contact in a central position or more towards one or the other end, as desired, the selected position being obtained by means of cutter adjustment as will be described. Generally, however, it is desirable to have the center of contact at the center of the tooth so that under normal conditions the tooth is uniformly stressed in the central position, the flank contact being able to shift through approximately equal distance towards either end if one of the gears is pushed further in or partly withdrawn.

The bevel gears preferably used in practice have a large degree of tooth overlap but nevertheless small axial pressures. In this direction, too, the invention has an important feature, since owing to the adjustment of the cutter relative to the basic face gear a curve is generated, which has a very small initial spiral angle, and thus permits of cutting a large width of tooth compared with the face gear radius, while still having the advantage of small axial pressure and a high degree of insensitiveness.

By making the spiral angle at the smallest diameter as small as possible, an additional advantage is gained, namely an increase of insensitiveness of the gears, since that part of the Palloid curve is obtained which changes its curvature most quickly from the small to the large diameter of the gear. Hence the generated tooth curves of the driving and driven gears fit into each other perfectly, forming a large contact zone with a margin for wandering in case of axial displacement.

The hob shown in Fig. 3 may have a single screw thread or a plurality of screw threads, the pitch surface line on which the pitch is measured being concave. Inasmuch as, generally speaking, the top and root portions of the gears are not in engagement, the shape of the top and root portions of the hob cutter are of secondary importance. For convenience of manufacture the hob teeth are generally of equal depth, and normally use is made of a hob the top and root lines of which are concave, the hob surface being a curvilinear surface of revolution generated by a concave line.

The thickness of the cutter teeth measured either on the curved pitch line or on the chord, varies from end to end, being equal at the large and small diameters, but decreasing towards the center of the surface line. Viewed from the small diameter, the pitch of the concave flank increases towards the center of the surface line, whence it decreases again towards the large diameter. On the convex tooth flank of the cutter the pitch decreases towards the center of the surface line and thence increases towards the large diameter.

Figure 6A:
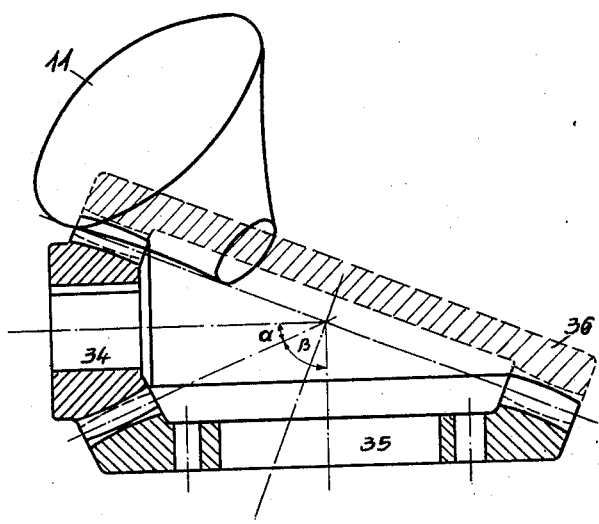
Fig. 6a is a view showing the relative position between the imaginary face gear and the bevel gears.
Figure 6B:
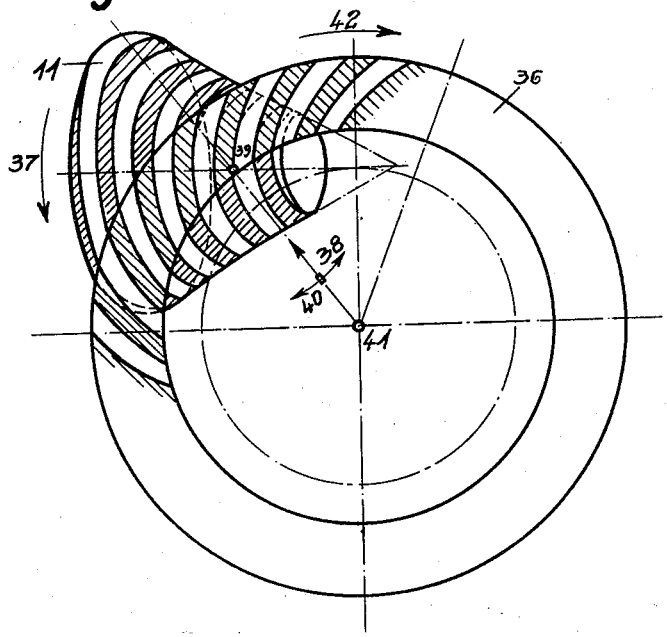
Fig. 6b shows the position of the hob relative to the imaginary face gear.
Figure 11:
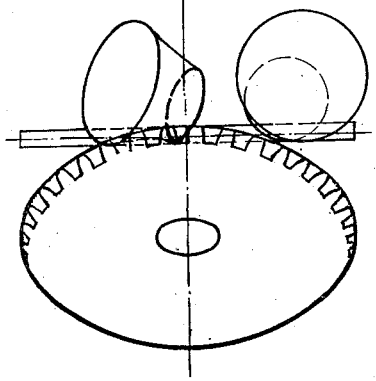
Fig. 11 is a perspective view showing the starting and end positions of the cutter in relation to the blank.
Figure 13A:
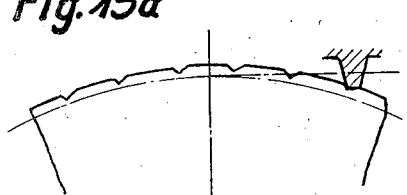
Figs. 13a to 13d illustrate the generating of the tooth profile in the course of the passage of a single cutter tooth.
Figure 13B:
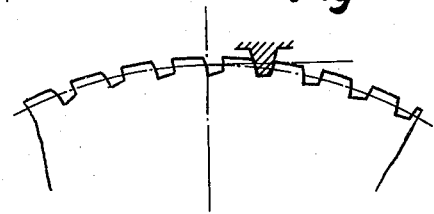
Figure 13C:
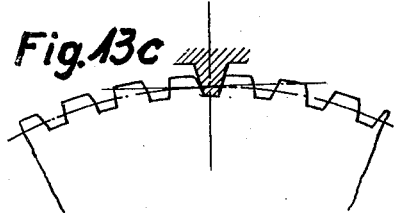
Figure 13D:
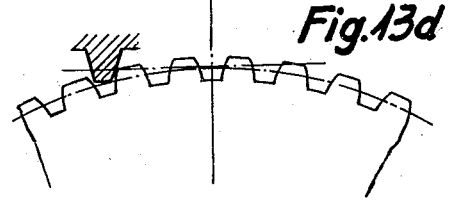

The hob cutter 11 described serves for generating the improved tooth system. By suitably mounting the cutter on a face plate of the hobber rotating about its axis, it is able to perform or effect the following movements (see Figs. 6, 11, 12):

1. The rotation of the cutter about its axis in the direction of the arrow 37, the number of revolutions being $n_f$.

2. Rotation of the face gear, due to the cutter rotation, in the direction of the arrow 42, the number of revolutions being $n_{p1}$.

With the cutter having $Z_f$ threads and the face gear having $Z_{p1}$ teeth the ratio may be represented as follows:

$$N_f : n_{p1} = Z_{p1} : Z_f$$

3. Radial adjustment of the cutter with reference to the face plate center 41 in the direction of the arrow 38, to regulate the distance of the cutter from the center 41 of the face plate.

4. Rocking of the cutter through an angle of $90° - (\tau \pm \gamma)$ (Fig. 8) to the radius line of the face plate about the point 39, in the direction of the arrow 40.

Figures 7, 8:
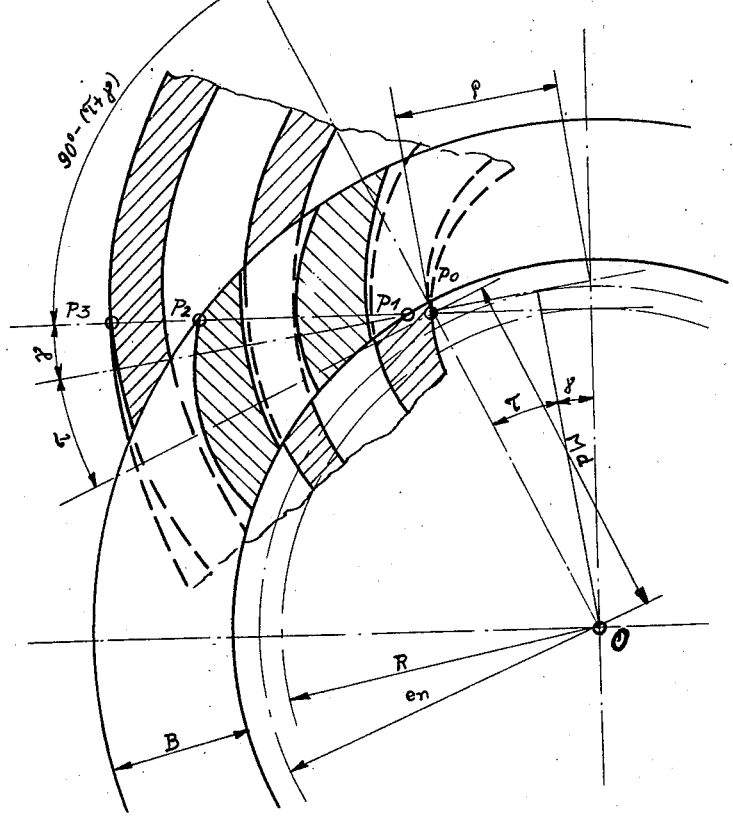
Fig. 7 is a diagram explanatory of the relative adjustment of the cutter and the basic face gear.
Fig. 8 is a plan view thereof in which part of the cutter outline is developed.

With the adjustments mentioned under 3 and 4 it is possible to adjust the surface line of the cutter tangentially to a circle concentric to the face plate center with the radius R, Fig. 8.

5. Rotation of the face plate together with the cutter about the center 41 of the face plate and basic face gear 36.

The purpose of this rotation is to move the cutter in the track of the basic face gear around the point 41 (Fig. 6), with the cutter teeth gradually cutting into the blank, producing the gear teeth to their full depth in a single operation and during one pass (see Figs. 13a to 13d).

Figure 9:
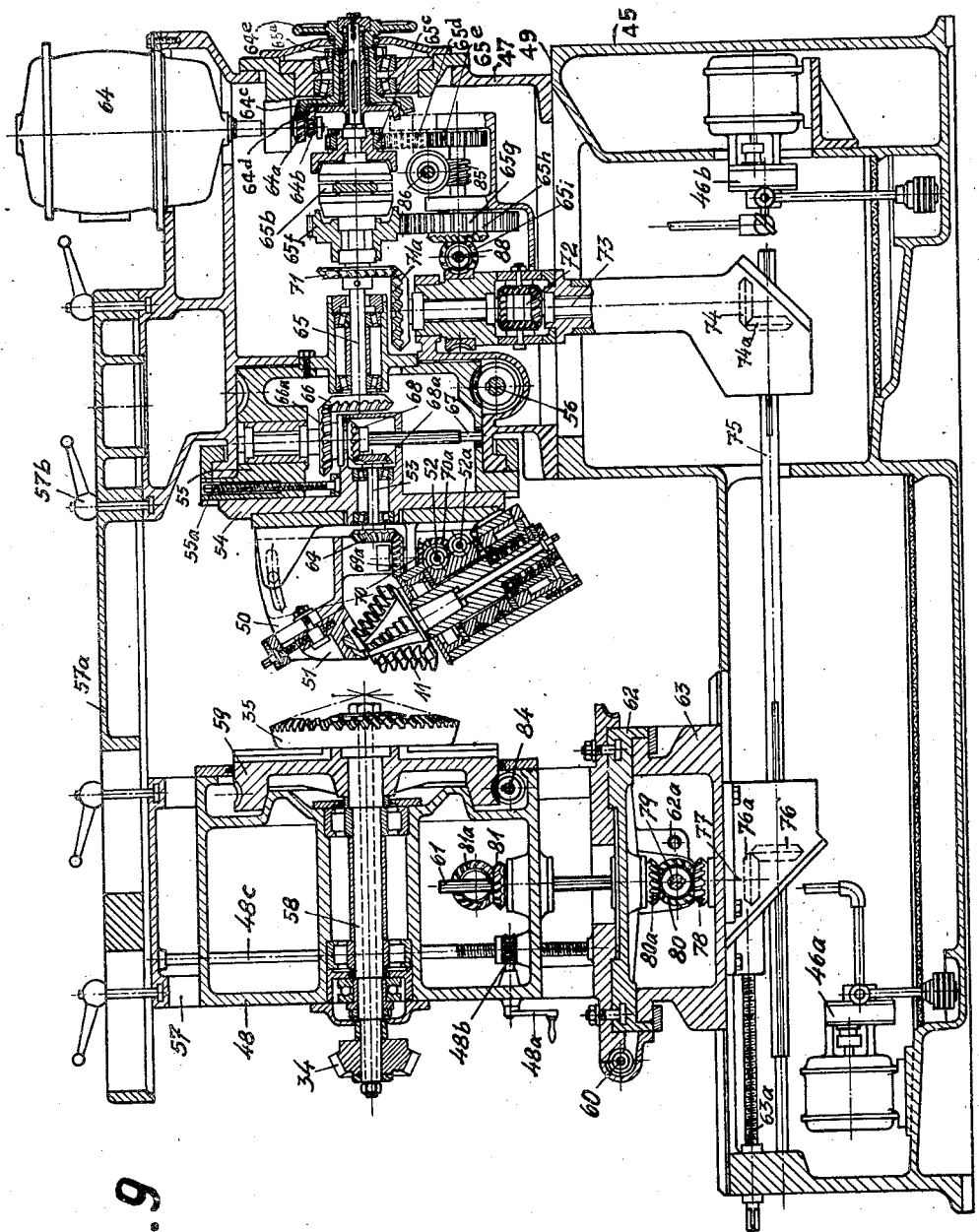
Fig. 9 is a section taken through the hobbing machine.

6. Rock motion of the cutter about an axis 52 (Fig. 9).

This motion is necessary to permit cutters with various angles $\epsilon$ to be used in the hobber, and certain corrections to be conveniently made for producing the contact zone of the teeth in the desired position.

Figure 12:
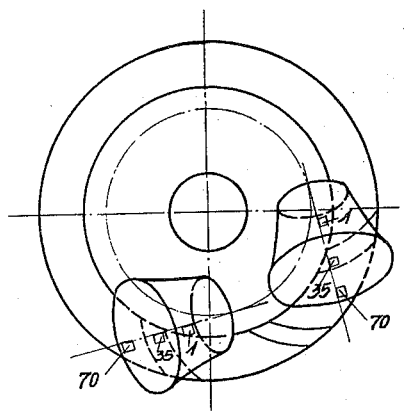
Fig. 12 is a plan view of Fig. 11.

As already mentioned, the cutter represents in axial section a concave rack (Fig. 3), and the teeth of this rack are perpendicular to the chord of the arc defined by the root, top and pitch surface lines. The cutter is so positioned across the whole tooth width of the bevel gear that the mentioned rack extends over the whole width of tooth (Fig. 8). When the cutter and the blank rotate, the rack travels in the direction of the cutter axis, to the left or right according to the direction of the cutter lead. The teeth at one end of the cutter form the part of the rack at the inside diameter of the gear and the teeth at the other end form the part of the rack at the outside diameter of the bevel gear. Hence, a small part of the tooth width of the bevel gear is apportioned to each cutter tooth (Fig. 12). In the case of a cutter having, for example, 10 grinding flutes and seven teeth in each row, the first tooth being located at the inside diameter, and the last tooth at the outside diameter of the work, the width of the tooth is subdivided into 70 small parts, each machined by one cutter tooth. Since the rack is concave towards the outside, the pitch and root outline surfaces of the bevel gear will be curved, the curves being convex towards the outside. The teeth of the bevel gears having pitch outline surfaces convex towards the outside are consequently slightly thicker in the central portions than at the ends, so that the tooth flanks do not make contact over the whole length of the teeth. Normally, the contact zone of two meshing tooth flanks extends from the center of the tooth in both directions.

It is, however, not always necessary to have the contact zone at the central portion of the tooth. With a given curvature of the cutter surface line, position of the contact zone may be regulated by adjusting the cutter. In this connection the following considerations must be borne in mind: The width of tooth B to be cut prescribes the length of the operative cutting part of the cutter, and this effective length of the cutter, in turn, determines the adjustment of the cutter. Assuming, for example, that a gear having teeth of the width B is to be cut (Fig. 8) the total cutter length $P_0$—$P_3$ will not be effective in cutting, but only the length having the chord $P_1$—$P_2$. This chord must be adjusted to the plane of the basic face gear, and must accordingly be swung through the angle $\eta$ (Fig. 7). By changing the angle $\eta$ it is possible to transfer the contact zone from the central portion of the tooth to the larger or smaller base of the gear.

As already mentioned, it is desirable in connection with bevel gears having inclined or curved teeth to have the highest possible degree of overlapping, together with the minimum axial pressure. These two requirements are, however, incompatible with each other, and generally one can only be obtained at the expense of the other. With our process, therefore, it is of great importance to have means for adjusting the cutter on the hobber in such a way, that a curved tooth is produced having at its inside diameter a very small spiral angle, which increases comparatively quickly towards the large diameter, in order to obtain adequate overlap.

An additional advantage of the small spiral angle at the small diameter lies in the fact that in case of axial displacement of the pinion the difference between the disengagement of the flank portions at the inner and outer ends of the tooth is more pronounced than with a larger spiral angle. Hence by means of slight axial displacement of the pinion the gears may be easily adjusted to produce the most efficient mesh when assembling them. To obtain this minimum of spiral angle the cutter is so adjusted on the hobber that its surface line lies in the plane of the basic face gear. Since the surface line of the cutter is curved, the basic face gear also has a curved pitch surface.

Furthermore, the cutter is so adjusted relative to the face gear that the first complete tooth at the small cutter diameter is radially distanced by an amount $M_d$ from the center point of the face gear, and the chord of the concave pitch surface line in its extension is tangent to a circle with the radius R about the center point of the face gear, this circle being smaller than the normal pitch circle of the face gear with the radius $e_n = \frac{1}{2} Z_{p1} \cdot M_n$. The normal to the direction of lead at the first complete cutter tooth, then, is tangent to the said normal pitch circle of the face gear. In the above equation, $Z_{p1}$ means the number of teeth of the face gear, $M_n$ the module of that cutter lead which corresponds to the first complete tooth at the small diameter, since the cutter has non-uniform lead. The radius R is found from the relation $$R = M_d \cdot \cos(\tau + \gamma)$$

The calculation of the distance $M_d$ may be derived from the Figures 7 and 8. The radius of curvature $\rho$ of the concave tooth curve at the point $P_0$, Fig. 8, of the small gear diameter must be equal to or larger than the radius of curvature $\rho_F$ of the convex cutter tooth flank of the first solid tooth at the small cutter diameter at the point P, the latter radius being determined from $$\rho_F = \frac{R_k}{\sin(\epsilon + \delta)} \leq \rho$$

where $\epsilon$ is the angle formed by the chord of the concave cutter surface line and the cutter axis $\delta$ is the half flank angle of the cutter tooth.

To obtain the smallest spiral angle at the small diameter of the gear, it must be $$\rho = \rho_F$$

Hence, the distance $M_d$ is expressed by $$M_d = \sqrt{e_n^2 + (\rho_F - e_n \cdot tg\gamma)^2}$$

$\gamma$ being the lead angle of the cutter tooth spiral at the point P (Fig. 7).

The angle of setting $\tau$ results from $$\cos \tau = \frac{e_n}{M_d} = \frac{\frac{1}{2} Z_{p1} \cdot M_n}{M_d}$$

This adjustment of the cutter is of great importance. With this adjustment, the smallest radius of curvature of the convex cutter tooth flank of the first complete tooth at the smallest cutter diameter perfectly answers its purpose.

To hob a right-hand spiral gear, a left handed cutter is preferably used, and vice versa, a left-hand spiral gear being preferably cut by a right-handed cutter.

The cutters described also have the feature of forming the teeth so that the grinding of the flanks, after the hardening process, can be facilitated by providing a surplus of material at the roots and tops of the teeth, where the teeth are subjected to the greatest abrasive action. To this end, the cutter flank for shaping the driving gear flank is given a smaller pressure angle than the cutter flank for shaping the driven gear flank.

The highest rates of sliding movement occur at the tops and roots of the teeth. Here, the abrasive action is greatest, and it decreases towards the pitch circle. Accordingly, the surplus of material should increase from the pitch circle towards the root and top ends of each tooth. Owing to the fact, however, that in the engagement of two gears the top of a tooth of the driven gear first engages the meshing counter-flank below the pitch circle, a surplus of material at the tops of the teeth of the driven gear and at the root portions of the teeth of the driving gear would favour the formation of an impact edge at the bottom of the driving gear, and this would cause noise when the gears are running. For this reason, the tops of the driven gear tooth faces and the roots of the driving gear tooth flanks must be set back. The driving flank of the driving gear slides out of engagement with the driven flank of the meshing gear, thus requiring grinding allowances at the tops of the driving teeth and at the roots of the driven teeth.

The grinding allowance at the tops of the driving gear teeth is obtained by giving the cutter for the driving gear a smaller, more acute flank angle, and the grinding allowance at the roots of the driven gear teeth is obtained by giving the counter-cutter a larger, more obtuse flank angle.

The teeth at the larger diameter of the cutter perform the principal roughing cuts, and since, with the teeth coming nearer to the smaller diameter, the radius of action of the teeth becomes smaller, the share of roughing work allocated to each tooth gradually becomes smaller and smaller, so that the cutting teeth in the first screw thread at the smaller end of the cutter only perform finishing cuts, the preceding teeth, owing to their larger radius of action, performing the roughing work for the cutter teeth in the subsequent screw threads towards the smaller end. In order that the cutting capacity of the teeth located towards the larger end may be as large as possible, in accordance with the increasing roughing work to be performed by them, the teeth have an undercut face angle instead of a radial cutting face. This undercut face angle has the smallest value at the small diameter and gradually increases towards the large diameter, until it attains a maximum value. Thus, the undercut face angle may for example amount to 10° at the large diameter and to 0° at the small diameter. The limiting values depend on the material to be hobbed (see Fig. 5). This variability of the undercut face angle is provided for by making use of a special grinding machine, the grinding wheel of which, controlled by a template, is inclined at a variable angle with respect to the radial line of cutter. The swinging axis of the wheel exactly coincides with the top line of the cutter teeth.

Figure 10:
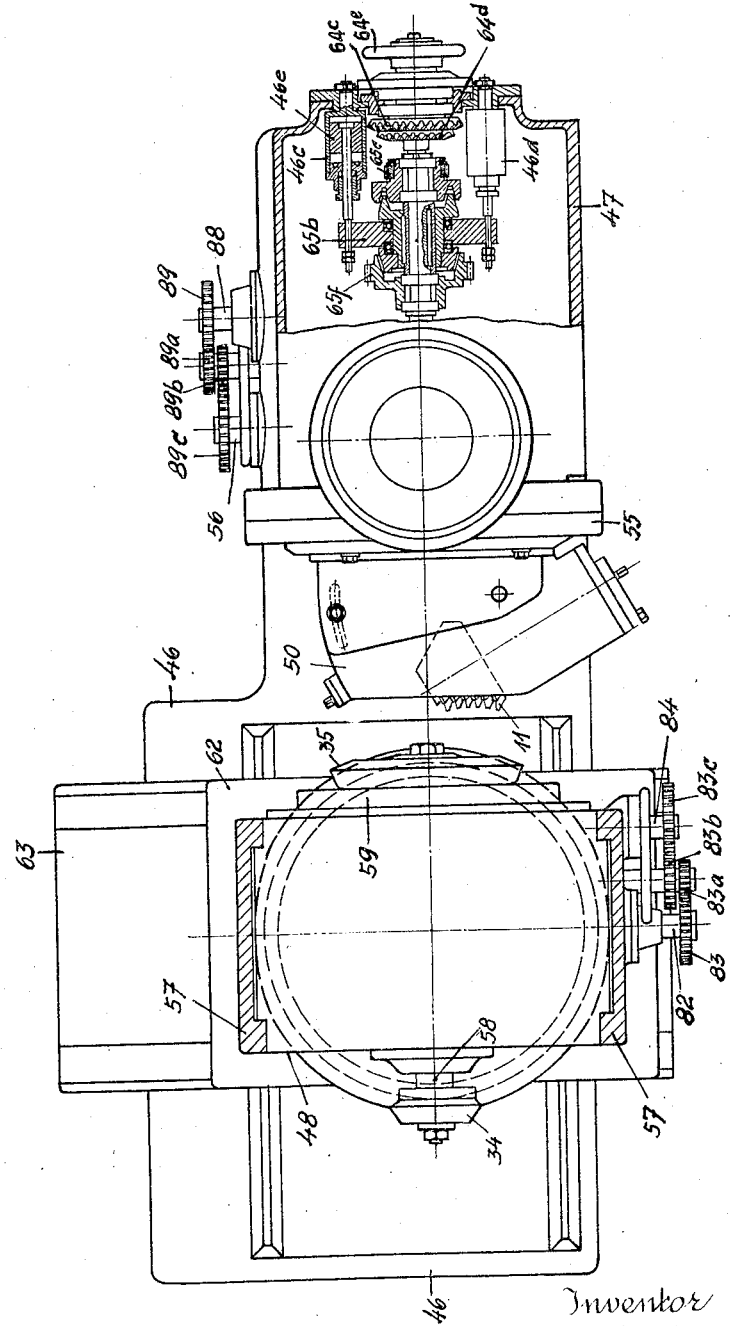
Fig. 10 is a plan view of the hobbing machine.

The machine used for hobbing the bevel gears by means of the cutters described is designed on the principle illustrated in Figs. 9 and 10, but these figures show only one of several possible types of construction. The machine is adapted for cutting bevel gears with intersecting and crossing axes. The cutter headstock 47 resting on the guide way on the bed 46 is adjustable on the guide way 49 to set the cutter for the required depth of cut. The hob 11 is clamped to the cutter head 50 and supported at its smaller diameter by the outer support 51. The cutter head 50 can be swung about the axes 52 and 53. The plate 54 carrying the cutter head 50 is fixed on the face plate 55 so as to be radially adjustable by means of the spindle 55a. The face plate 55 rotating about the center axis 65 of the machine is driven by the worm 56. The work headstock 48 is vertically adjustable between a guide 57 by means of a crank 48a and a worm gearing 48b the worm gear of which is made to form a nut engaging with the threaded spindle 48c and carries the work spindle 58, on one end of which is mounted the large indexing worm gear 59 being the clamping plate 60 for the crown gear 35, and on the opposite end of the spindle, the pinion 34 may be mounted.

Of course, pinion and crown gear may both be mounted at one end of the work spindle. The guide 57 can be rotated through 360° about the axis 61 by means of the worm 60, and rests on the cross slide 62 which can be adjusted parallel to the plane of the face plate. The cross slide 62, in turn, rests on a longitudinal slide or carriage 63 movable in the direction of the machine axis. The drive of the machine is effected from the motor 64 on the shaft 65. On the motor shaft are mounted two bevel pinions 64a and 64b having different sizes. The pinions mesh with crown gears 64c and 64d, respectively, the larger gear system being permanently in engagement, since the crown gear 64c is so mounted on the hub of the smaller crown gear that it cannot be shifted axially, but is free to rotate on said hub. The smaller crown gear 64d is axially adjustable on the shaft 65a and drives the latter by means of a key. By turning the hand wheel 64e and by means of the threaded hub the crown gear 75 may be withdrawn out of engagement with pinion 64b and pressed with its cone friction surface against the friction surface of the large crown gear 64c so that the latter is coupled to the shaft 65a which, in this case, is driven with a number of revolutions different from that when immediately driven from the smaller crown gear 64c. From the shaft 65a, the drive is subdivided into—

1. Drive of the hob cutter,
2. Drive of the work spindle and
3. Drive of the face plate.

From the shaft 65a, the drive is transmitted to the cutter by means of clutch 65b, shaft 65, bevel gears 66 and 66a, shaft 67, sliding bevel gears 68 and 68a, shaft 53, bevel gears 69, 69a and 70 and 70a, double worm gearing 52 and 52a. The drive of the work spindle takes place from the bevel gears 71 and 71a through differential 72, shaft 73, bevel gears 74 and 74a, shaft 75, sliding bevel gears 76, 76a, shaft 77, bevel gears 78, shaft 79, sliding bevel gears 80, 80a, shaft 61, sliding bevel gears 81, 81a, shaft 82, indexing change gears 83, 83a, 83b, 83c, worm shaft 84, and the large indexing worm gear 59 mounted on the work spindle 58. The drive of the face plate 55 may be derived from the clutch 65b either for the slow working motion through the spur gears 65c, 65d, 65e, and transmitted to the worm 85 or for the quick return motion through the spur gears 65f, 65g and bevel gears 65h, 65i to the differential worm shaft 88. The shaft 86 leads to a speed change gear box, not shown, and to the mentioned shaft 88, whence the worm gear of the face plate is driven through the change gears 89, 89a, 89b, 89c and worm shaft 56.

The cross slide 62 is moved on the guide way of the longitudinal slide 63 by means of the screw spindle 62a. The longitudinal slide 63 is movable on the bed in the direction of the machine axis by means of the screw spindle 63a.

To secure a machine motion free from vibrations and to have a rigid connection between the work and cutter headstocks, the latter are tied up by a connecting beam 57a which may be turned on a centering pad of the cutter headstock and shifted longitudinally on the work headstock. The beam is tightened by means of binding screws 57b after the machine has been set up.

An oil pump 46a is provided for cooling the hob. Another oil pump 46b supplies lubricating oil under pressure which is fed while circulating to the cylinders 46c and 46d in which the pistons 46e move under the pressure of the oil to actuate the clutch 65b either for the working or quick return motion of the plane disc. The pressure oil overflowing from the two cylinders 46c and 46d (see Fig. 10) is used for lubricating the gearing in housing 47. This gearing drives the hob, the work and the plane disc. In the event of a failure of the oil pump 46b, the pressure of the oil in the cylinders 46c and 46d drops, and the clutch 65b is disconnected from the plane disc. By this arrangement, feeding of the hob to the work is stopped in case of failure of the pump 46b.

What I claim as my invention is:
1. In a machine for generating bevel gears having teeth of approximately equal height throughout and of equal thickness at the two ends, and having tooth flanks curved more sharply on the convex side than on the concave side, the combination with a frame of a work support including a work spindle adapted to support a work piece; a hob support carrying a plane disc rotatable about a horizontal axis; a hob mounted on said disc, said hob having different end diam- eters, and trapezoidal helically arranged cutting teeth forming a concave surface, the teeth being of substantially uniform height throughout; a main driving shaft; means for driving the plane disc in either direction, said means including a friction clutch; a source of lubricating oil under pressure; and clutch actuating means connected to said source, said clutch actuating means being rendered operative by interruption of flow of said lubricating oil for disconnecting said clutch to stop rotation of said disc.

2. A machine for shaping bevel gears comprising a tool support; a plane disc rotatable in said tool support; a hob secured on said plane disc; means for driving said hob and said plane disc; slow advance and quick return mechanism between said driving means and said plane disc; fluid pressure control means for changing from one of said driving means to the other; means for lubricating said driving means from the overflowing fluid from said fluid pressure means; and means for stopping the rotation of the said plane disc upon interruption of the flow of fluid.

HEINRICH SCHICHT.